(12) United States Patent
Park et al.

(10) Patent No.: US 7,301,545 B2
(45) Date of Patent: Nov. 27, 2007

(54) METHOD OF VISUALLY MEASURING BRIGHTNESS OF AMBIENT LIGHTING AROUND DISPLAY DEVICE

(75) Inventors: Du-sik Park, Gyeonggi-do (KR);
Heui-keun Choh, Seoul (KR);
Hyun-Jeong Koo, Gyeonggi-do (KR);
Chang-yeong Kim, Gyeonggi-do (KR);
Jin-ho Yim, Gyeonggi-do (KR);
Dong-sik Park, Gyeonggi-do (KR);
Hwan-young Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 10/879,164

(22) Filed: Jun. 30, 2004

(65) Prior Publication Data
US 2005/0024538 A1 Feb. 3, 2005

(30) Foreign Application Priority Data
Jun. 30, 2003 (KR) .................... 10-2003-0043378

(51) Int. Cl.
G09G 5/02 (2006.01)
G09G 5/00 (2006.01)
G09G 3/30 (2006.01)
(52) U.S. Cl. .................... 345/594; 345/617; 345/77
(58) Field of Classification Search ............... 345/77, 345/617, 600, 207; 715/722
See application file for complete search history.

(56) References Cited

U.S. PATENT DOCUMENTS

| 5,483,259 | A | * | 1/1996 | Sachs ..................... 345/600 |
| 5,499,040 | A | | 3/1996 | McLaughlin et al. |
| 5,638,117 | A | | 6/1997 | Engeldrum et al. |
| 5,791,781 | A | | 8/1998 | Park et al. |
| 5,870,069 | A | | 2/1999 | Choh et al. |
| 5,956,015 | A | * | 9/1999 | Hino ....................... 345/600 |
| 6,078,309 | A | * | 6/2000 | Chen et al. ............. 345/589 |
| 6,084,564 | A | * | 7/2000 | Ohara et al. ............. 345/20 |
| 6,480,202 | B1 | * | 11/2002 | Deguchi et al. ......... 345/600 |
| 6,850,245 | B1 | * | 2/2005 | Murashita et al. ...... 345/589 |
| 6,870,529 | B1 | * | 3/2005 | Davis ..................... 345/207 |

* cited by examiner

*Primary Examiner*—Kee M. Tung
*Assistant Examiner*—Aaron M. Richer
(74) *Attorney, Agent, or Firm*—Staas & Halsey LLP (57) ABSTRACT

A method of visually measuring the brightness of ambient lighting around a display device is disclosed. In this method, first, a reference brightness of the display device is determined according to a type of display device. Thereafter, information about locations where the display device is used is received from the user, and illuminance values of the display device corresponding to brightness stages are set based on the reference brightness and the location information. Then, a reference brightness is converted into each of the illuminance values corresponding to each of the brightness stages. The converted images with the illumination values corresponding to the brightness stages are displayed to the user, and an image that has a brightness value nearest to the brightness of ambient lighting is selected, and the brightness value of the selected image is determined as the brightness of ambient lighting.

25 Claims, 4 Drawing Sheets

METHOD OF VISUALLY MEASURING BRIGHTNESS OF AMBIENT LIGHTING AROUND DISPLAY DEVICE

CROSS-REFERENCE TO RELATED APPLICATION

This application claims the priority of Korean Patent Application No. 2003-43378, filed on Jun. 30, 2003, in the Korean Intellectual Property Office, the disclosure of which is incorporated herein by reference.

BACKGROUND OF THE INVENTION

1. Field of the Invention

The invention relates to a method of visually measuring the brightness of ambient lighting surrounding a display device, and more particularly, to a method of visually measuring the brightness of ambient lighting, in which the state of a video display device is set to an optimal gray scale reproduction state, an image with brightness corresponding to one selected from a plurality of brightness stages is displayed to the user, the user selects a brightness stage corresponding to an image having brightness that is the most approximate to the brightness of ambient lighting, and a brightness value corresponding to the selected brightness stage is determined as the brightness of ambient lighting around a display device being used.

2. Description of the Related Art

Color management systems are generally used to achieve color matching between an input device and an output device. Color management systems use various color transformation methods for color matching, by referring to the color characteristics of each of the input device and the output device. The color and brightness of ambient lighting affect the perceived color produced by a display device. Recently color management systems are considering ambient lighting for color matching.

To achieve color matching, a color management system requires the color characteristics of each input or output device, which are obtained from a profile that is a computer program file that describes color characteristics. The profile has a specific format. For example, to achieve color matching between a display device and a color reproduction apparatus, a color management system requires a profile of the display device.

A display device manufacturer may provide a color characteristic profile that can be applied in a fixed state of ambient lighting. As such, a color management system can only use the color characteristic profile under a single color characteristic condition of a display device that is set by the display manufacturer. However, the color characteristic condition of a display device set by a display manufacturer does not meet the demand of various users for a color characteristic change. When ambient lighting is changed due to a change in an environment where the display device is used, the perceived color characteristics of the display device are changed. However, the color characteristic profile set by a display manufacturer does not reflect the change of the color characteristics of a display device. Hence, color matching between an input device and an output device is difficult.

U.S. Pat. No. 5,499,040 discloses a conventional technique in which devices known as calorimeters, photometers, or spectroradiometers are used to measure changes in the color characteristics of a display device that have been made due to a change in an environment where the display device is used or by the user. The measurements using these devices provide an accurate result. However, these devices are expensive and installation and operation of the devices is inconvenient. Therefore, an ordinary user of a display device cannot easily manipulate these devices.

There remains a need for a simple and inexpensive method to visually measure the color characteristics of a display device and those of ambient lighting. Examples of this method are disclosed in U.S. Pat. Nos. 5,638,117, 5,791,781, 5,870,069, 5,956,015, and 6,078,309. However, in the methods disclosed in U.S. Pat. Nos. 5,638,117, 5,791,781, 5,870,069, and 5,956,015, a separate color matching card is used to measure the color characteristics of ambient lighting and the color temperature of a display device, which causes additional cost. Also, U.S. Pat. No. 6,078,309 still does not propose a method to obtain the color and brightness characteristics of ambient lighting.

SUMMARY OF THE INVENTION

The invention provides a method of measuring a brightness of ambient lighting surrounding a display device that is inexpensive and does not require using extra measurement equipment or an extra matching card.

According to an aspect of the invention, there is provided a method of visually measuring the brightness of ambient lighting around a display device. In this method, a reference brightness of the display device is determined according to a type of the display device. Information relating to locations where the display device can be used is received from the user, and illuminance values of the display corresponding to brightness stages are set based on the reference brightness and the location information. The brightness of a reference image is converted into the illuminance values corresponding to the brightness stages, converted images with the illuminance values corresponding to the brightness stages are displayed to the user, and an image having a brightness value the most approximate to the brightness of the ambient lighting is selected by the user. Thus, the brightness value of the selected image is determined as the brightness of ambient lighting.

To determine the reference brightness of the display device, a plurality of gray patterns that partially overlap one another are displayed to determine a black level of the display device. A basic brightness of the display device is multiplied by a function value of a contrast index of the display device that is set with a maximum value. A function value of a brightness index of the display device increased from a minimum value and stopped increasing at the moment when the gray patterns are visually distinguished from one another is added to the result of the multiplication. Thus, the result of the addition is determined as the reference brightness of the display device.

Alternatively, to determine the reference brightness of the display device, a plurality of gray patterns that partially overlap one another are displayed to determine a white level of the display device. A basic brightness of the display device is multiplied by a function value of a contrast index of the display device that is decreased from a maximum value and stopped decreasing when the gray patterns are visually distinguished from one another. A function value of a brightness index of the display device fixed with a predetermined value is added to the result of the multiplication. Thus, the result of the addition is determined as the reference brightness of the display device.

Alternatively, to determine the reference brightness of the display device, a type of the display device is selected. If the display device is a self-luminescent display device, a plurality of gray patterns are displayed to set a black level of the display device. However, if the display device is a transmissive display device, a plurality of gray patterns are displayed to set a white level of the display device. If the display device is a self-luminescent display device, a brightness index of the display device is controlled by using a brightness adjuster of the display device. However, if the display device is a transmissive display device, a contrast index of the display device is controlled by using a contrast adjuster of the display device. Thus, the reference brightness of the display device is determined depending on whether the gray patterns are visually distinguished from one another.

The gray patterns may partially overlap one another, and adjacent gray patterns may have a predetermined color difference in a visually uniform color space.

If the display device is a self-luminescent display device, the reference brightness of the display device is obtained by multiplying a basic brightness of the display device by a function value of a contrast index of the display device that is set with a maximum value and adding to the result of the multiplication a function value of a brightness index of the display device that is increased from a minimum value and stopped increasing at the moment when the gray patterns are visually distinguished from one another.

If the display device is a transmissive display device, the reference brightness of the display device is obtained by multiplying a basic brightness of the display device by a function value of a contrast index of the display device that is decreased from a maximum value and stopped decreasing at the moment when the gray patterns are visually distinguished from one another and by adding to the result of the multiplication a function value of a brightness index of the display device fixed with a predetermined value.

The brightness of the reference image is converted into the illuminance values corresponding to the brightness stages by adding or subtracting a basic conversion amount corresponding to a selected place and a selected brightness stage to or from a value of the reference image.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
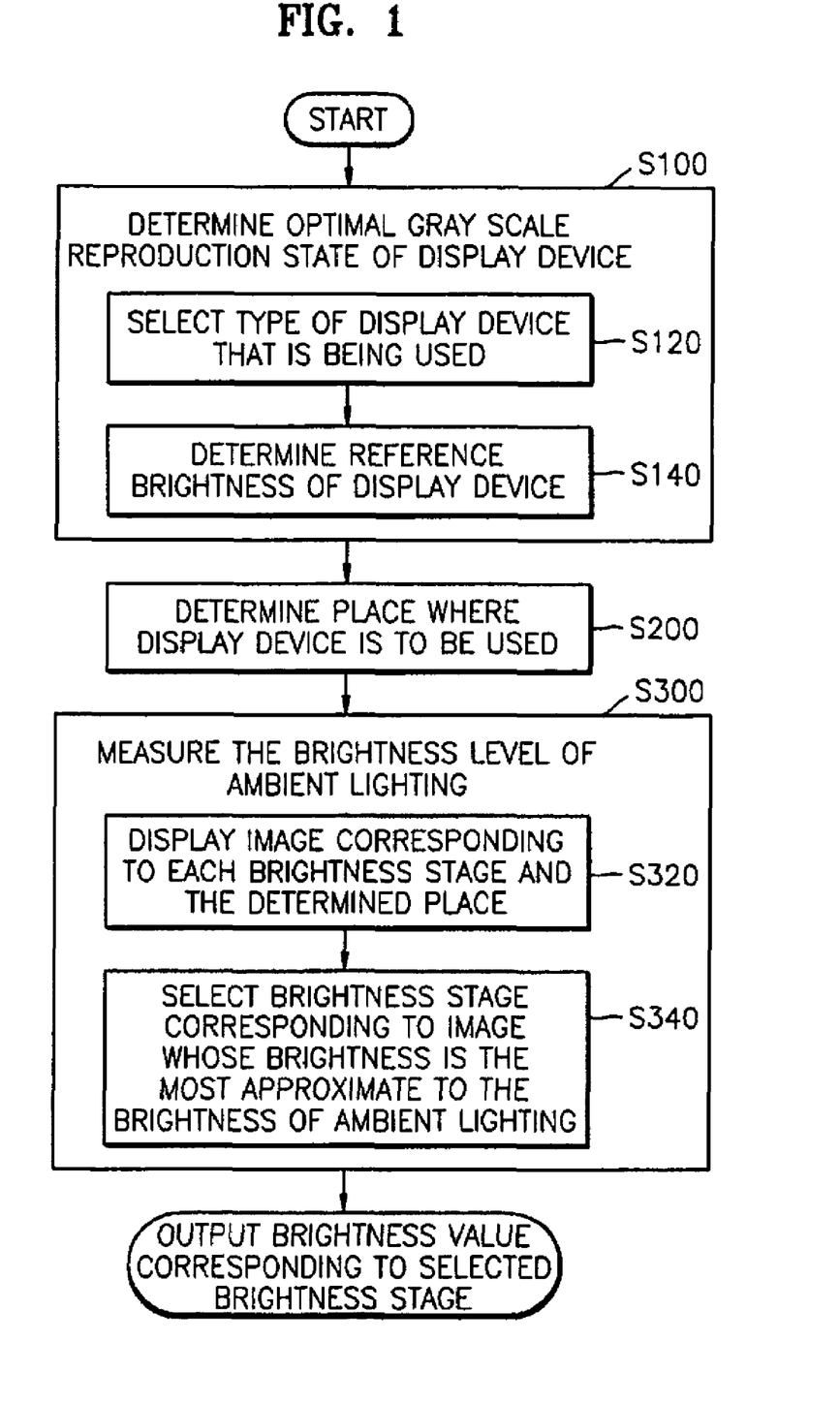
FIG. 1 is a flowchart for illustrating a method of visually measuring the brightness of ambient lighting around a display device according to an embodiment of the invention.

FIG. 1 is a flowchart for illustrating a method of visually measuring the brightness characteristics of ambient lighting around a display device according to an embodiment of the invention. Referring to FIG. 1, the method invention includes operation 100 of determining an optimal gray scale reproduction state of a display device, operation 200 of selecting a place where the display device is to be used from possible places where the display device can be used, and operation 300 of measuring the brightness of ambient lighting.

Operation 100 includes sub-operation 120 of selecting the type of a display device that is being used and sub-operation 140 of determining the level of reference brightness operation 300 includes sub-operation 320 of displaying an image into which a reference image with the reference brightness is converted depending on each of brightness stages and the determined place where the display device is to be used, and sub-operation 340 of selecting from the brightness stages a brightness stage corresponding to an image whose brightness is the most approximate to the brightness of ambient lighting.

More specifically, in operation 100, the user selects an item corresponding to the type of a current display device from presented items representing the types of display device. In operation 120, the user selects either an item representing a self-luminescent display device, such as a cathode ray tube (CRT) or an item representing a transmissive display device such as a liquid crystal display (LCD).

In step S140, a reference brightness is determined depending on the selected display device type. The reference brightness is determined by either setting a black level or and setting a white level. A determination of whether the black or white level is set is made depending on the type of a display device used. If the brightness of ambient lighting is measured by comparing the brightness of a displayed image with the brightness of ambient lighting accurately determining the reference brightness is important.

If the display device being used is a self-luminescent display device, for example, a CRT, it is important to determine the reference brightness by adequately lowering a black level for the self-luminescent display device. If the display device currently being used is a reflective or transmissive type display device, for example, an LCD, it is important to determine the reference brightness by adequately raising a white level for the reflective or transmissive type display device. Thus, to determine the reference brightness, an optimal gray scale reproduction state is determined in different ways according to the type of display device being used, and a plurality of gray patterns are compared with one another. The method of setting a black level for a CRT is described below with reference to FIG. 2A.

Figure 2A:
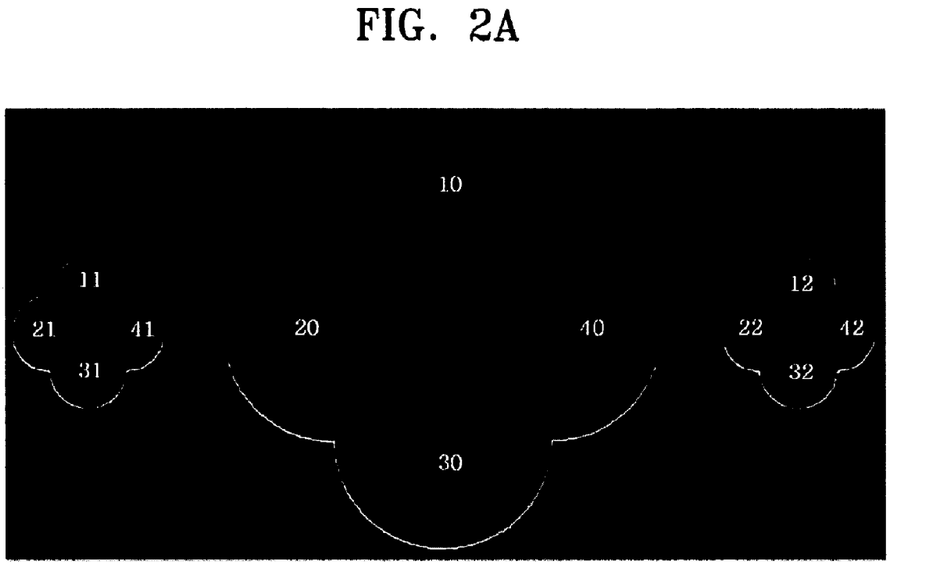
FIGS. 2A and 2B each show gray patterns used to determine an optimal gray scale reproduction state of a display device.

FIG. 2A shows gray patterns used to set a black level for a display device. As shown in FIG. 2A, a gray pattern in which four gray circles overlap one another is displayed at the center of a display screen, and gray patterns in each of which four gray circles overlap, the circles having smaller diameters than the four overlapping circles displayed at the center of the display screen overlap are respectively and are displayed on the right and left sides of the display screen. As shown in FIG. 2A, the gray patterns at the center and right and left sides of the display screen have the same shape because in some display devices adopting an on-screendisplay (OSD) system, a control image appears at the center of the display screen to cover up the gray pattern at the center of the display screen.

The gray circles in each gray pattern are arranged counterclockwise starting from a top gray level, and adjacent circles except for the circles at the top and right sides of the gray pattern have a color difference of 1 in the CIE LAB color space. The CIE LAB color space a uniform color space proposed by the Commission Internationale de l'Eclairage (CIE) in 1976. A color difference ($\Delta Ea*b*$) between each of circles 10, 11, and 12 at the top sides of gray patterns and each of circles 20, 21, and 22 at the left sides thereof is 1, a color difference ($\Delta Ea*b*$) between each of the circles 20, 21, and 22 at the left sides thereof and each of circles 30, 31, and 32 at the bottom sides thereof is 1, and a color difference ($\Delta Ea*b*$) between each of the circles 30, 31, and 32 at the bottom sides thereof and each of circles 40, 41, and 42 at the right sides thereof is 1. The circles 10, 11, and 12 on the top sides of the gray patterns are set to have the darkest color that can be displayed on a display device. Therefore, a digital value of 0 is input to express the circles 10, 11, and 12 on the top sides of the gray patterns. It is understood by those skilled in the art that the color difference may be set to a uniform color space that is greater than 1.

In a method of determining the reference brightness by using the gray patterns of FIG. 2A, the user adjusts the value of a contrast index to a maximum value by using a contrast adjustor of a display device and also adjusts the value of a brightness index to a minimum value by using a brightness adjustor of the display device. The user then gradually increases the brightness index. When the four gray circles of FIG. 2A start being visually distinguished from one another, the user stops increasing the brightness index. The resultant brightness index of the display device and the set contrast index of the display device determine the reference brightness of the display device. In other words, the reference brightness of a display device is expressed as "reference brightness=f(contrast index)*(basic brightness of a display device)+f(brightness index)". The basic brightness of the display device can be a brightness (cd/m$^2$) of the display device depending on a brightness index and a contrast index that are set in a specific state. For example, the brightness index and the contrast index may be set when the display device is manufactured. In the expression of the reference brightness of a display device, f(contrast index) can be given by: "f(contrast index)=a contrast index+0.5", and f(brightness index) can be given by: "f(brightness index)=100*(brightness index)−50". Each of the contrast index and the brightness index serving as the variables of these functions uses 0 to express a minimum value and uses 1 to express a maximum value. The function f(contrast index) and the function f(brightness index) represent the characteristics of a display device and are pre-defined. The reference brightness of a display device is expressed in the unit of the basic brightness of the display device.

Figure 2B:
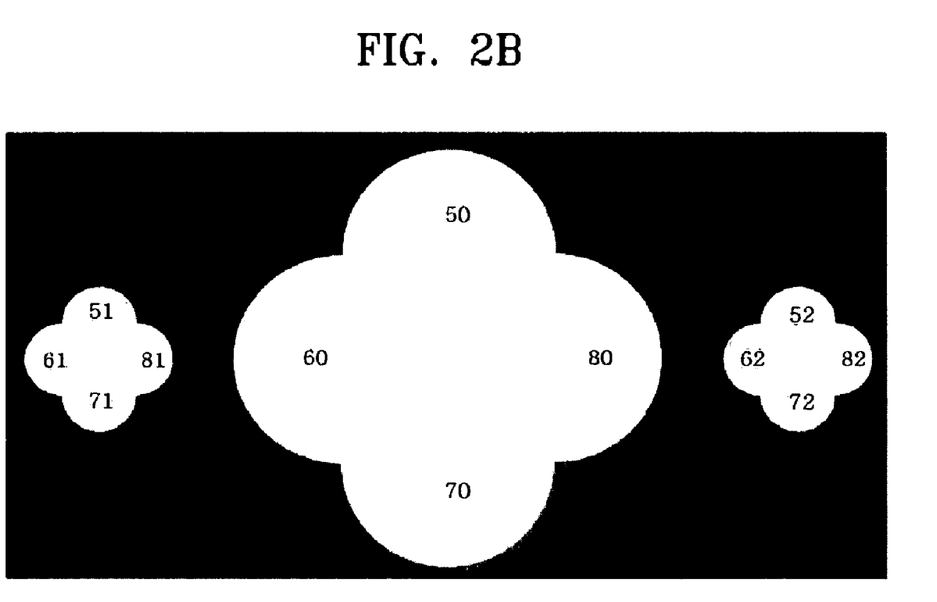

FIG. 2B shows gray patterns used to set a white level for a transmissive display. The structure of each of the gray patterns of FIG. 2B is the same as that of FIG. 2A. Similar to each of the gray patterns of FIG. 2A, adjacent circles except for the circles, at the top and right sides of the gray pattern, have a color difference of 1 in the CIE LAB color space. More specifically, a color difference ($\Delta Ea*b*$) between each of circles 50, 51, and 52 at the top sides of the gray patterns and each of circles 60, 61, and 62 at the left sides thereof is 1, a color difference ($\Delta Ea*b*$) between each of the circles 60, 61, and 62 at the left sides thereof and each of circles 70, 71, and 72 at the bottom sides thereof is 1, and a color difference ($\Delta Ea*b*$) between each of the circles 70, 71, and 72 at the bottom sides thereof and each of circles 80, 81, and 82 at the right sides thereof is 1. The circles 50, 51, and 52 on the top sides of the gray patterns are set to have the brightest color that can be displayed on the display device. In other words, when a circle pattern is expressed in 8 bits, a digital value of 255 is input to express the circle pattern. It is understood by those skilled in the art that the color difference may be set to a uniform color space that is greater than 1.

In a method of determining the reference brightness by using the gray patterns of FIG. 2B, the user adjusts the value of a contrast index to a maximum value by using the contrast adjustor of the display device. The user then gradually decreases the contrast index. When the four gray circles of each gray pattern of FIG. 2B start being visually distinguished from one another, the user stops decreasing the contrast index. The brightness index of the display device keeps an initial brightness index value that the user has set. The unchanged brightness index of the display device and the decreased contrast index of the display device determine the reference brightness of the display device.

Figure 3:
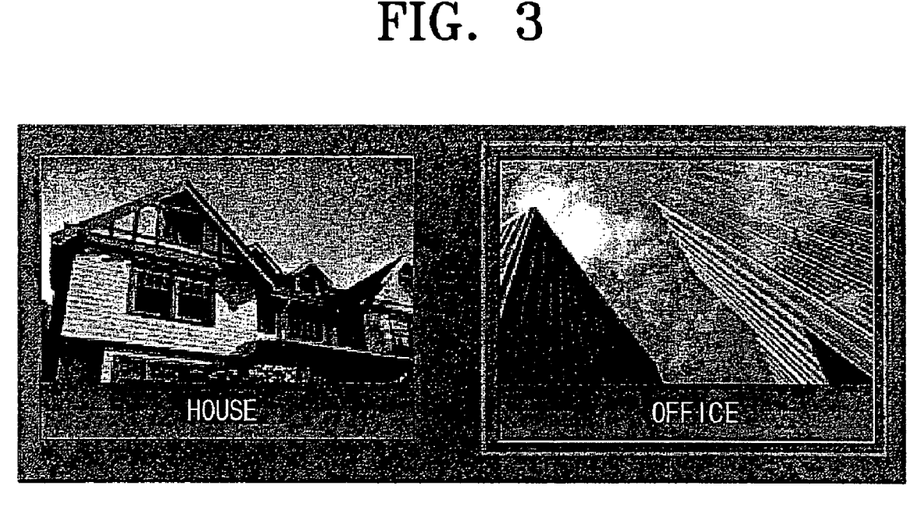
FIG. 3 shows a user interface used to determine a place where a display device is to be used.

Referring again to FIG. 1, operation 140 of determining the reference brightness of a display device is followed by operation 200 of determining a place where the display device is to be used. Referring to FIG. 3, a selection menu including possible locations from a plurality of locations where the display device can be used is presented to the user so that the user can select one location. As shown in FIG. 3, two possible locations, for example, a house and an office, may be presented to the user, and the locations may be represented by characters, pictures, symbols, etc. The user selects a location where the display device is to be used from the presented selection menu.

Also, in operation 200, illuminance values corresponding to brightness stages are set differently according to the selected place where the display device is to be used and the reference brightness set in operation 100. An example of this illuminance setting is shown in Table 1.

TABLE 1

| Brightness stages/places | House | Office |
| --- | --- | --- |
| Very bright | 300 LUX | 500 LUX |
| Slightly bright | 200 LUX | 300 LUX |
| Average | 150 LUX | 200 LUX |
| Slightly dark | 50 LUX | 100 LUX |
| Very dark | 10 LUX | 50 LUX |

Figure 4:
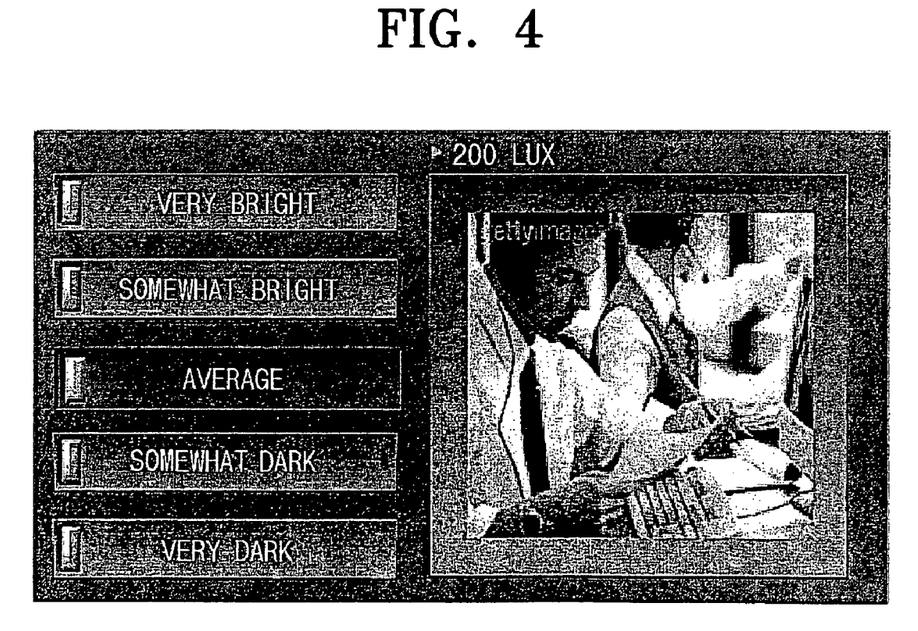
FIG. 4 shows a user interface used to determine the level of the brightness of ambient lighting.

After setting the reference brightness of the display device in operation 140 and determining the location where the display device is to be used in operation 200, operation 300 of measuring the brightness of ambient lighting is executed by presenting a user interface for determining the brightness of ambient lighting to the user in operation 320 and then by selecting an illuminance value with reference to an image displayed on the user interface in operation 340. FIG. 4 shows an example of the user interface for determining the brightness of ambient lighting. As shown in FIG. 4, the user interface presents to the user a predetermined number of brightness stages and a reference image that depends on a location and a brightness stage that are selected by the user.

As shown in Table 1 and FIG. 4, the brightness stages can be expressed as five psychologically-recognized amounts, such as, very bright, slightly bright, average, slightly dark, and very dark. The brightness of the reference image presented on the user interface is converted into an illuminance value corresponding to each of the brightness stages of Table 1. It is understood that the brightness stages may be expressed in tiny cognizable way for the user to select from.

Referring back to FIG. 1, if the user selects a brightness stage from the brightness stages presented on the user interface, a converted image with an illuminance value corresponding to the selected brightness stage is displayed on the user interface, in operation 320. Thereafter, in operation 340, the user compares the illuminance value of the displayed image with the brightness of ambient lighting and finally selects a brightness stage corresponding to an image having a brightness value nearest to the brightness of ambient lighting. The brightness value corresponding to the selected brightness stage is determined as the brightness of ambient lighting surrounding the display device.

Figure 5:
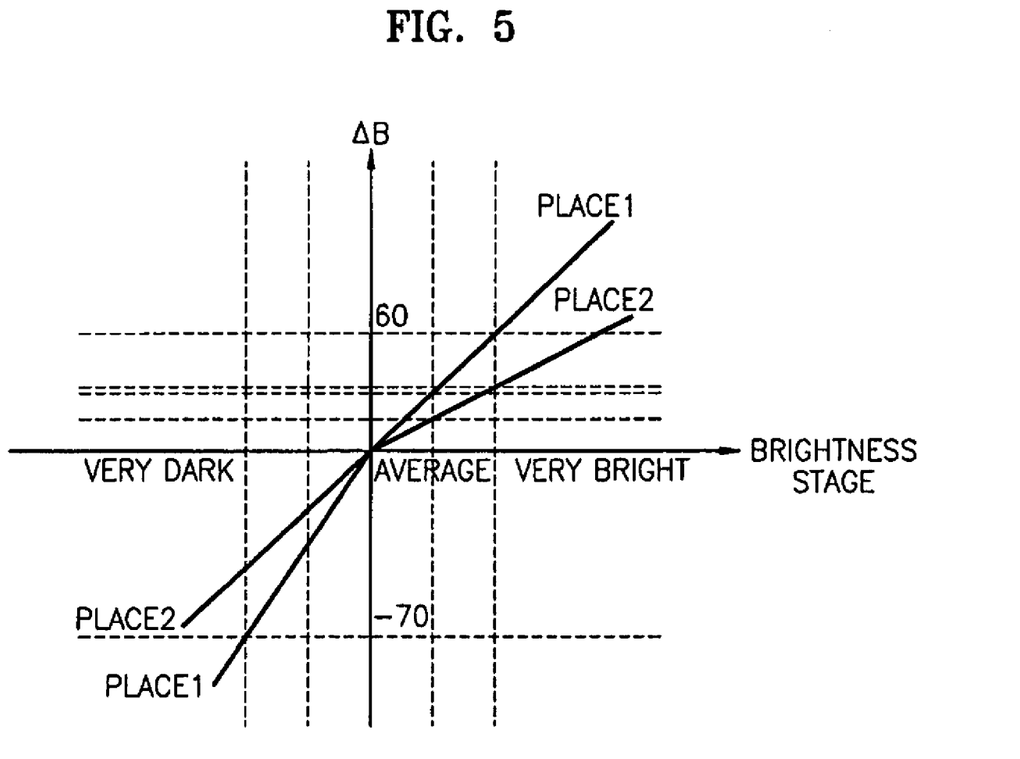
FIG. 5 shows a function that determines the amount of image conversion depending on a determined place and a determined brightness stage.

A method of converting the brightness of a reference image depending on each brightness stage is described below with reference to FIG. 5. This conversion method can be expressed as in Equation 1:

$$O = I + \Delta I \tag{1}$$

wherein I denotes a value of an image signal in a basic brightness stage (i.e., average), O denotes a value of an image signal converted according to each brightness stage, and $\Delta I$ denotes an image conversion amount. Equation 1 can be equally applied to red, green, and blue channels of an image signal, and $\Delta I$ varies according to a selected brightness stage and a selected place where the display device is to be used.

The way of determining the image conversion amount $\Delta I$ is described below with reference to FIG. 5, which shows an example of a function that determines the image conversion amount according to a selected brightness stage and a selected location where a display device is to be used. First, a basic conversion amount $\Delta B$, which varies depending on a selected brightness stage and a selected location where a display device is to be used, is determined. As shown in FIG. 5, if the selected brightness stage is "very bright" and the selected location is "location 1", the basic conversion amount $\Delta B$ is 60. The basic conversion amount $\Delta B$ is pre-set in the form of a function or a lookup table. If the basic conversion amount $\Delta B$ is determined, the final image conversion amount $\Delta I$ depends on the value I of the image signal in the basic brightness stage. The final image conversion amount $\Delta I$ is determined depending on the basic conversion amount $\Delta B$ in various ways, as described below.

For example, if the basic conversion amount $\Delta B$ is less than 0 and the absolute value of the value I is less than k times the absolute value of the basic conversion amount $\Delta B$, the final image conversion amount $\Delta I$ is $(1/k) \times I$. That is, the value of a converted image signal, O, is given by Equation 2:

$$O = I - \frac{1}{k} \times I \tag{2}$$

For example, if the absolute value of the input value I is greater than k times the absolute value of the basic conversion amount $\Delta B$, the final image conversion amount $\Delta I$ is determined to have the value of the basic conversion amount $\Delta B$. The value of a converted image signal, O, is given by Equation 3:

$$O = I + \Delta B \tag{3}$$

For example, if the basic conversion amount $\Delta B$ is greater than 0 and the absolute value of a maximum value MaxI−I is less than k times the absolute value of $\Delta B$, $\Delta I$ is $(1/k) \times (MaxI-I)$. The value of a converted image signal, O, is given by Equation 4:

$$O = I + \frac{1}{k} \times (MaxI - I) \tag{4}$$

For example, if the absolute value of MaxI−I is greater than k times the absolute value of $\Delta B$, $\Delta I$ is determined to have the value of $\Delta B$. The value of a converted image signal, O, is given by Equation 3. It will be apparent to those skilled in the art that ways other than the above-described ways can be used to convert the brightness of a reference image into illuminance values corresponding to brightness stages.

In another aspect of the invention, the invention is embodied as computer readable codes on a computer readable recording medium. The computer readable recording medium is any data storage device that can store data that can be thereafter read by a computer system. For example, the computer readable recording medium may include read-only memory (ROM), random-access memory (RAM), CD-ROMs, magnetic tapes, floppy disks, optical data storage devices, etc. Also, the computer readable codes can be transmitted via a carrier wave such as a network or World Wide Web. The computer readable recording medium can also be distributed over a network coupled computer systems so that the computer readable code is stored and executed in a distributed fashion.

In a measurement method according to the invention as described above, the brightness of ambient lighting surrounding a display device is visually measured without using extra measurement equipment or an extra matching card. Thus, the measurement method according to the present invention is applicable to various apparatuses including a video display device in order to convert the color and brightness characteristics of an image at a low cost while adequately coping with various user environments. Also, the color of ambient lighting surrounding a display device that is measured by the measurement method according to the invention can be used in writing a color profile of the display device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of visually measuring the brightness of ambient lighting surrounding a display device, the method comprising:

selecting the type of the display device;

displaying a plurality of gray patterns to set a black level of the display device when the display device is a self-luminescent display device and displaying a plurality of gray patterns to set a white level of the display device when the display device is a transmissive display device;

determining a reference brightness of the display device according to whether the gray patterns are visually distinguished from one another by using a brightness adjuster or a contrast adjuster;

receiving information about at least one location where the display device is used from a user and setting illuminance values of the display device corresponding to brightness stages based on the reference brightness and the location information;

converting a reference image into a converted image having the illuminance values corresponding for each of the brightness stages;

displaying the converted images to the user; and selecting an image having a brightness value nearest to the brightness of the ambient lighting, such that the brightness value of the selected image is determined as the brightness of ambient lighting.

2. The method of claim 1, wherein the determining of the reference brightness of the display device comprises:

displaying a plurality of gray patterns that partially overlap one another in order to determine a black level of the display device; and determining as the reference brightness of the display device a value that is obtained by multiplying a basic brightness of the display device by a function value of a contrast index of the display device that is set with a maximum value and adding to the result of the multiplication a function value of a brightness index of the display device that is increased from a minimum value and the increasing is stopped when the gray patterns are visually distinguished from one another.

3. The method of claim 1, wherein the determining of the reference brightness of the display device comprises:

displaying a plurality of gray patterns that partially overlap one another in order to determine a white level of the display device; and determining as the reference brightness of the display device a value that is obtained by multiplying a basic brightness of the display device by a function value of a contrast index of the display device that is decreased from a maximum value and the decreasing is stopped when the gray patterns are visually distinguished from one another and by adding to the result of the multiplication a function value of a brightness index of the display device fixed with a predetermined value.

4. The method of claim 1, wherein the determining of the reference brightness of the display device comprises:

determining the reference brightness of the display device according to whether the gray patterns are visually distinguished from one another, by controlling a brightness index by using a brightness adjuster of the display device if the display device is the self-luminescent display device or by controlling a contrast index by using a contrast adjuster of the display device if the display device is the transmissive display device.

5. The method of claim 4, wherein the gray patterns partially overlap one another.

6. The method of claim 4, wherein adjacent gray patterns have a predetermined color difference in a visually uniform color space.

7. The method of claim 4, wherein in the determining of the reference brightness of the display device, if the display device is the self-luminescent display device, the reference brightness of the display device is obtained by multiplying a basic brightness of the display device by a function value of the contrast index of the display device that is set with a maximum value and adding to the result of the multiplication a function value of the brightness index of the display device that is increased from a minimum value and the increasing is stopped when the gray patterns are visually distinguished from one another.

8. The method of claim 4, wherein in the determining of the reference brightness of the display device, if the display device is the transmissive display device, the reference brightness of the display device is obtained by multiplying a basic brightness of the display device by a function value of the contrast index of the display device that is decreased from a maximum value and the decreasing is stopped when the gray patterns are visually distinguished from one another and by adding to the result of the multiplication a function value of the brightness index of the display device fixed with a predetermined value.

9. The method of claim 1, wherein in the converting the reference image, the reference brightness of the reference image is converted into the illuminance values corresponding to the brightness stages by adding or subtracting a basic conversion value corresponding to a selected location and a selected brightness stage to or from a value of the reference image.

10. The method of claim 9, wherein in the converting the reference image, if the basic conversion value is a negative value, and the value of the reference image is less than a predetermined number of times the absolute value of the basic conversion amount, then the brightness of the reference image is converted into the illuminance values corresponding to the brightness stages by subtracting the product of the value of the reference image and the reciprocal of the predetermined number from the value.

11. The method of claim 9, wherein in the converting the reference image, if the basic conversion value is a positive value, and the difference between the value of the reference image and a maximum value is less than a predetermined number of times the absolute value of the basic conversion amount, then the brightness of the reference image is converted into the illuminance values corresponding to the brightness stages by adding the product of the difference and the reciprocal of the predetermined number to the value of the reference image.

12. A computer readable medium storing a program to execute the method of claim 1.

13. A method of visually measuring a brightness of ambient lighting surrounding a display device, the method comprising:

selecting a type of display device as either a self luminescent display-type device or a reflective or transmissive display-type device;

displaying a plurality of gray patterns that overlap one another;

determining the reference brightness of the display device by determining an optimal gray scale reproduction state of the display device according to whether the gray patterns are visually distinguished from one another;

selecting a location of the display device from at least one predetermined location corresponding with the determined reference brightness;

displaying at least one brightness stage from a plurality of brightness stages for a user to select according to the determined reference brightness and the selected location such that a converted image having an illuminance value corresponding to the selected brightness stage is displayed; and comparing the illuminance value of the displayed image with the brightness of the ambient lighting and selecting the brightness stage corresponding to an image having a brightness value nearest to the brightness of the ambient lighting, wherein the optimal gray scale reproduction state of the display device is determined depending on the type of display device, such that a white level of the reference brightness is adjusted and set for the reflective or transmissive display-type device, and a black level of the reference brightness is adjusted and set for the self luminescent display-type device.

14. The method of visually measuring the brightness of lighting surrounding the display device of claim 13, wherein setting and adjusting the black level of the reference brightness comprises:
   adjusting a value of a contrast index to a maximum value and a value of a brightness index to a minimum value; and
   increasing the value of the brightness index until the plurality of overlapping gray patterns are visually distinguishable from one another, wherein the resultant brightness index and the set contrast index of the display device determine the reference brightness of the display device.

15. The method of visually measuring the brightness of lighting surrounding the display device of claim 14, wherein the reference brightness of the display device is a function of the contrast index multiplied with a basic brightness value of the display device plus a function of a brightness index, wherein the basic brightness value of the display device is pre-set.

16. The method of visually measuring the brightness of lighting surrounding the display device of claim 13, wherein setting and adjusting the white level of the reference brightness comprises:
   adjusting a value of a contrast index to a maximum value and a value of a brightness index to a minimum value; and
   decreasing the value of the contrast index until the plurality of overlapping gray patterns are visually distinguishable from one another, wherein the resultant contrast index and the set brightness index of the display device determine the reference brightness of the display device.

17. The method of visually measuring the brightness of lighting surrounding the display device of claim 16, wherein the reference brightness of the display device is a function of the contrast index multiplied with a basic brightness value of the display device plus a function of a brightness index, wherein the basic brightness value of the display device is pre-set.

18. The method of visually measuring the brightness of lighting surrounding the display device of claim 13, wherein the selecting the location of the display device comprises determining the location of the display device according to a menu of predetermined locations corresponding to locations where the display device is to be used, wherein illuminance values corresponding to the plurality of brightness stages are set according to the selected location where the display device is to be used and the determined reference brightness.

19. The method of visually measuring the brightness of lighting surrounding the display device of claim 13, wherein the measuring the brightness of the ambient lighting is executed by displaying a user interface allowing the user to select the illuminance value with reference to the image displayed on the user interface.

20. The method of visually measuring the brightness of lighting surrounding the display device of claim 19, further comprising displaying a predetermined number of the brightness stages and the reference image on the user interface.

21. The method of visually measuring the brightness of lighting surrounding the display device of claim 13, wherein each of the plurality of brightness stages is set according to a psychologically recognized level of brightness.

22. The method of visually measuring the brightness of lighting surrounding the display device of claim 21, wherein the brightness of the reference image displayed on the user interface is converted into an illuminance value corresponding to each of the plurality of brightness stages, respectively.

23. The method of visually measuring the brightness of lighting surrounding the display device of claim 13, further comprising comparing the illuminance value of the displayed image with the brightness of the ambient lighting and selecting the brightness stage corresponding to the image having the brightness value that is nearest to the brightness of the ambient lighting.

24. The method of visually measuring the brightness of lighting surrounding the display device of claim 13, wherein the gray patterns partially overlap one another.

25. The method of visually measuring the brightness of lighting surrounding the display device of claim 13, wherein adjacent gray patterns have a predetermined color difference in a visually uniform color space.

* * * * *